(12) United States Patent
Nakamura

(10) Patent No.: US 6,930,297 B1
(45) Date of Patent: Aug. 16, 2005

(54) IMAGE SENSING DEVICE AND DISTANCE MEASURING DEVICE USING THE IMAGE SENSING DEVICE

(75) Inventor: Kenji Nakamura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/478,372

(22) Filed: Jan. 6, 2000

(30) Foreign Application Priority Data

Jan. 8, 1999 (JP) ................................. 11-002834

(51) Int. Cl.$^7$ .............................................. G01B 9/04
(52) U.S. Cl. ................................ 250/201.8; 356/3.14
(58) Field of Search .......................... 250/208.1, 201.2, 250/201.6, 201.8, 559.38; 356/3.14; 396/104, 396/128

(56) References Cited

U.S. PATENT DOCUMENTS

| 5,715,043 A | 2/1998 | Hasegawa et al. ............ 356/314 |
| 5,760,896 A | 6/1998 | Suzuki ........................ 356/3.08 |
| 6,072,564 A * | 6/2000 | Nakamura et al. ......... 356/3.14 |

FOREIGN PATENT DOCUMENTS

JP          2055912          2/1990

* cited by examiner

Primary Examiner—Thanh X. Luu
(74) Attorney, Agent, or Firm—Burns, Doane, Swecker & Mathis, LLP

(57) ABSTRACT

A first and a second sensor array 21 and 22 arranged at the approximate image forming plane of a pair of optical systems, and a third sensor array 23 arranged at a spacing h from the first and second sensor arrays 21 and 22. The image interval X is corrected to a standard image interval K=X (1−tan θ/tan(ψ+θ)) when the object image intersects the optical base length $R_0$ via the object image inclination ψ=tan$^{-1}$ (h/z) calculated from the image forming positions of the object images $T_1$ and $T_2$ detected by the sensor arrays 21 and 22, and the dislocation angle θ formed by the sensor and the optical system detected after assembling the device.

11 Claims, 13 Drawing Sheets

Fig. 15(a)
Conventional
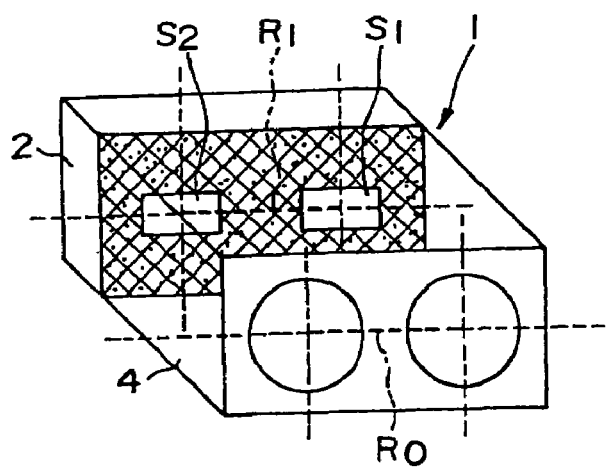
Fig. 15(b)
Conventional
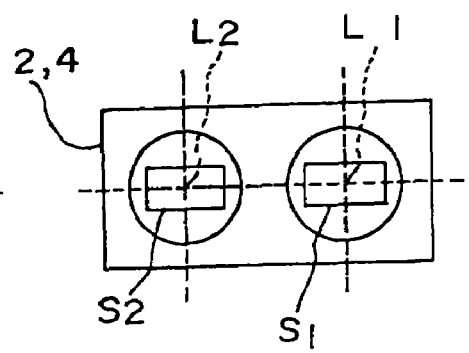
Fig. 16(a)
Conventional
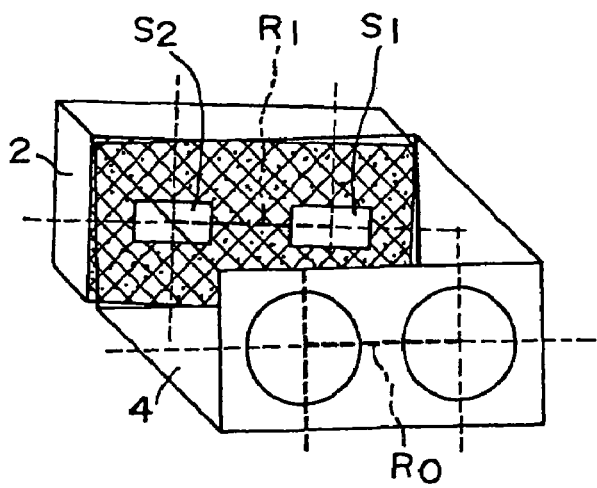
Fig. 16(b)
Conventional
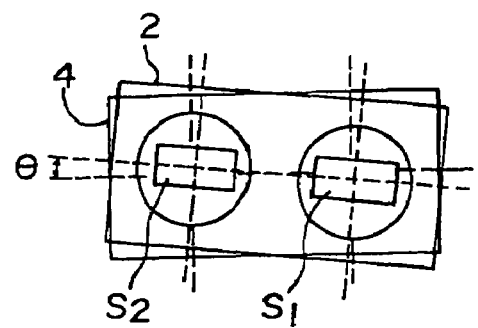

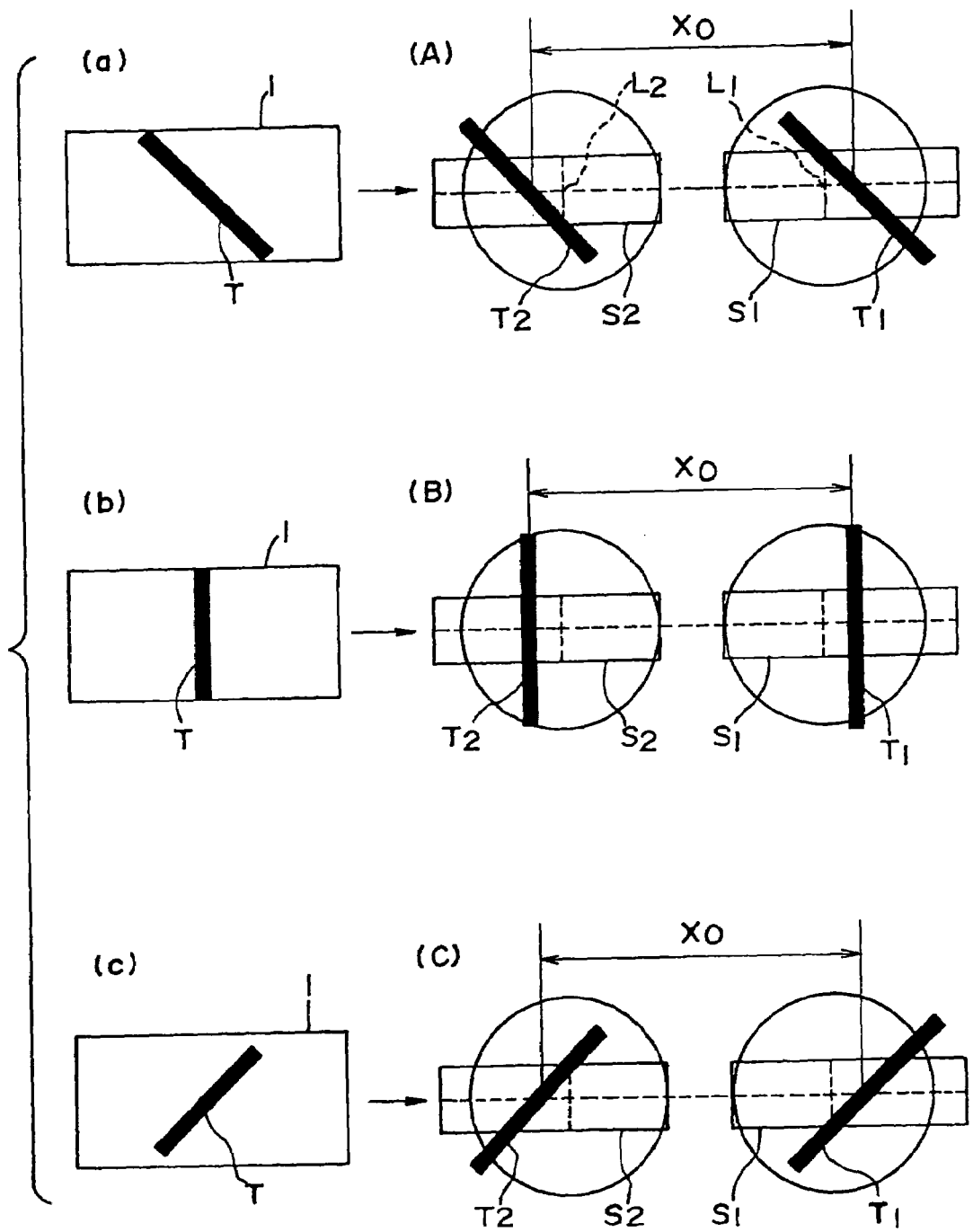
Fig. 17
Conventional

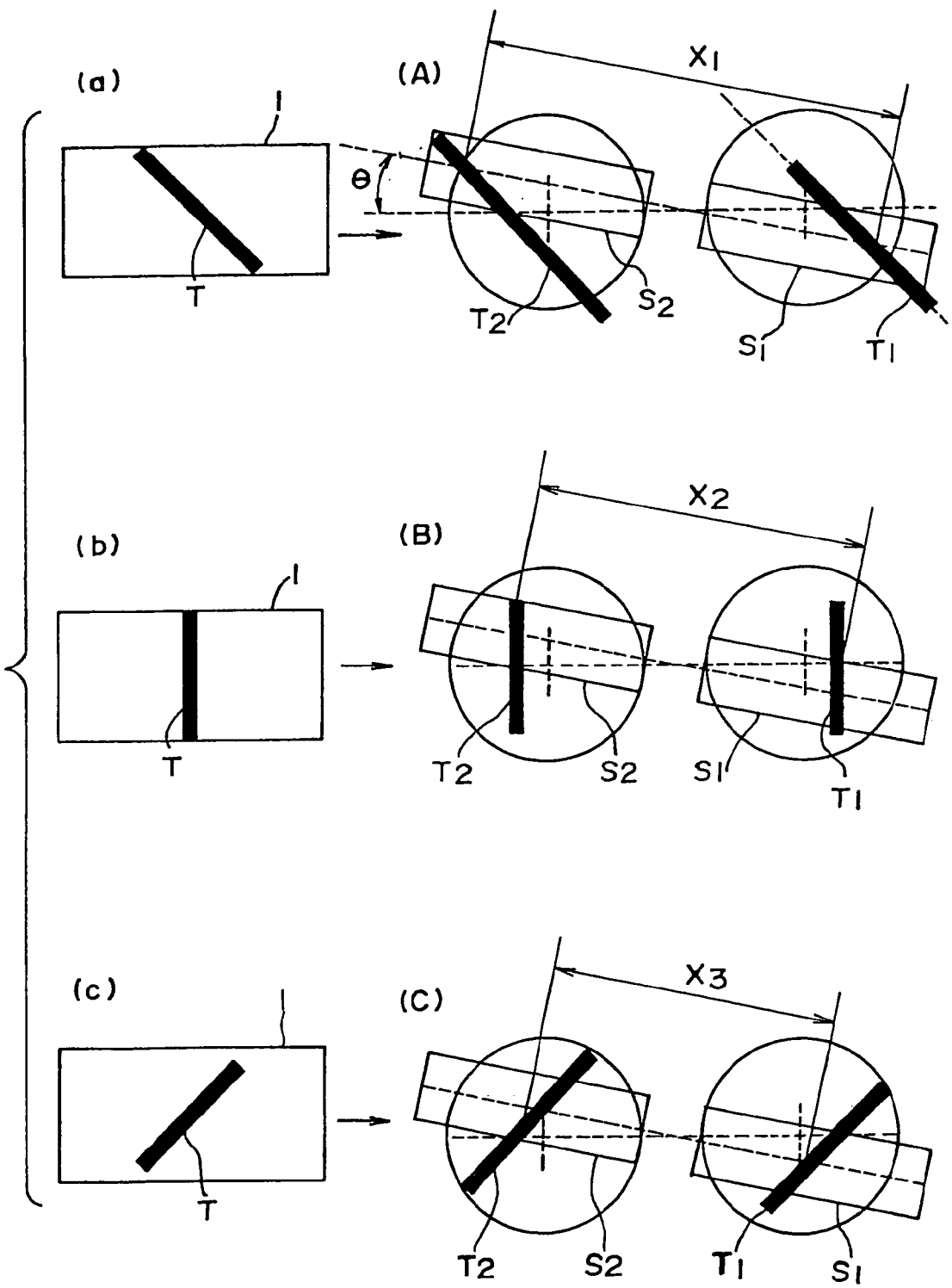
Fig. 18
Conventional

000
IMAGE SENSING DEVICE AND DISTANCE MEASURING DEVICE USING THE IMAGE SENSING DEVICE

This application is based on Patent Application No. HEI 11-2834 filed in Japan, the content of which is hereby incorporated by reference.

BACKGROUND OF THE INVENTION

1. Field of the Invention

The present invention relates to an image sensing device and a distance measuring device/focus detecting device using the image sensing device, and further relates to an image sensing device and a distance measuring device using the image sensing device suitable as, for example, a finder for a movie camera, camera using silver halide film, still video camera, and a distance measuring device installed in an automobile.

2. Description of the Related Art

Conventionally, distance measuring device such as, for example, a non-TTL passive-type distance measuring device 1 comprises an optical unit 4 including a pair of optical systems, and a sensor unit 2 including a pair of sensor arrays $S_1$ and $S_2$, as shown in the perspective view of FIG. 15(a) and the see-through perspective from the optical system of FIG. 15(b). The line connecting the optical axes $L_1$ and $L_2$ of the pair of optical systems is referred to as the optical base length $R_0$, and the line connecting the centers of the pair of sensor arrays $S_1$ and $S_2$ is referred to as the sensor base length $R_1$.

When the optical base length $R_0$ and the sensor base length $R_1$ are parallel, there is no change in the distance $X_0$ (hereinafter referred to as the "image interval") between the detection positions of the formed images $T_1$ and $T_2$ of the object (hereinafter referred to as the "object image") detected by the pair of sensor arrays $S_1$ and $S_2$ as shown in (A)–(C) of FIG. 17, even when there is a change in the angle of the distant object (photographic object image) T relative to the distance measuring device 1 as shown in (a)–(c) of FIG. 17.

When, however, the optical base length $R_0$ and the sensor base length $R_1$ are not parallel and maintained an angle θ (i.e., when the right and left sensor arrays $S_1$ and $S_2$ do not achieve epipolar binding) as shown in FIGS. 16(a) and 16(b), there is a change in the image interval $X_1$–$X_3$ detected by the pair of sensor arrays $S_1$ and $S_2$ due to the angle of the measured object (photographic object) T relative to the distance measuring device 1, as shown in FIG. 18. For this reason when the distance to the object (photographic object) is measured by the triangulation principle based on the image interval of the formed images $T_1$ and $T_2$, the measurement result theoretically differs due to the angle of the object T. That is, errors arise in the measurement result due to the rotation of the object (photographic object) relative to the distance measuring device 1. When such a distance measuring device 1 is used in a camera, it is impossible to take a photograph which is accurately focused on the photographic object.

Since the angle θ formed by the optical base length $R_0$ and the sensor base length $R_1$ cannot be measured until after the distance measuring device 1 is assembled, it is extremely difficult to assemble the device such that the angle θ formed by the two base lengths is 0°.

SUMMARY OF THE INVENTION

An object of the present invention is to provide an image sensing device and a distance measuring device/focus detecting device using this image sensing device which can be used even when there is an error in the angle formed by the optical system and the sensor.

To achieve these objects, one aspect of the present invention has the following construction.

An image sensing device is provided with a pair of a first and a second optical system for forming a object image, and a pair of a first and a second sensor array for receiving the light of the object image and arranged in the approximate image forming plane of the optical systems, and a signal reader for reading the first and the second photoreception signal series comprising at least part of the photoreception signals of each sensor array. The image sensor comprises a third sensor array disposed in proximity to and parallel to the second sensor array, a third signal reader for reading a third photoreception signal series comprising at least a part of the photoreception signals of the third sensor array, a first corresponding position detector for detecting a first corresponding position of the second photoreception signal series relative to the first photoreception signal series, a second corresponding position detector for detecting a second corresponding position of the third photoreception signal series relative to the first photoreception signal series, and an angle detector for detecting the magnitude of the angle formed by the object, and the second and the third sensor arrays based on the first and the second corresponding positions.

In this construction, the magnitude of the angle formed by the object and the second and the third sensor arrays is detectable from the relative positional relationship between the second and the third sensor arrays, the position of the first corresponding position on the second sensor array, and the position of the second corresponding position on the third sensor array. Even if an error arises in the relative positional relationship of the optical system and the sensor arrays, if that error is known beforehand, the magnitude of the angle formed by the object and the sensor arrays can be accurately detected considering this error and correcting the magnitude of the angle formed by the object, and the second and the third sensor arrays.

Accordingly, the optical system and the sensors can be used even when there is an angle error.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIGS. 15(a), 15(b) and 17 show a construction of a conventional distance measuring device;

FIGS. 16(a), 16(b) and 18 show the dislocation of the optical system and sensor layouts in the distance measuring device of FIG. 15(a)

DETAILED DESCRIPTION OF THE PREFERRED EMBODIMENTS

The various embodiments of the present invention are described hereinafter with reference to the accompanying drawings.

First, the distance measuring device 10 of the first embodiment is described below with reference to FIGS. 1–5 and FIG. 19.

Figure 1A:
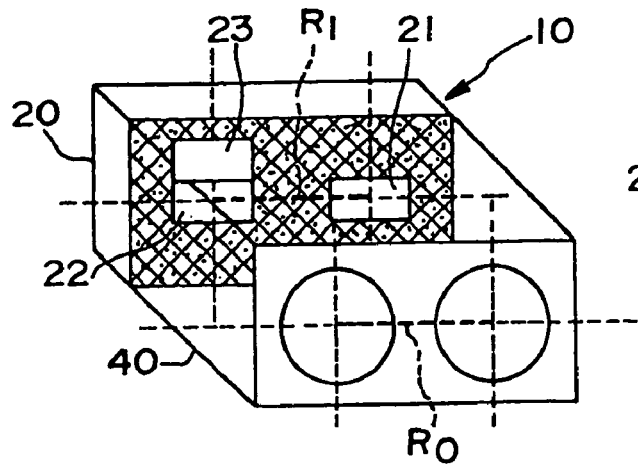
FIGS. 1(a) and 1(b) show the construction of a first embodiment of the present invention.
Figure 1B:
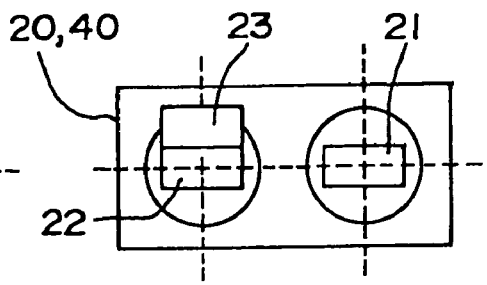
Figure 2:
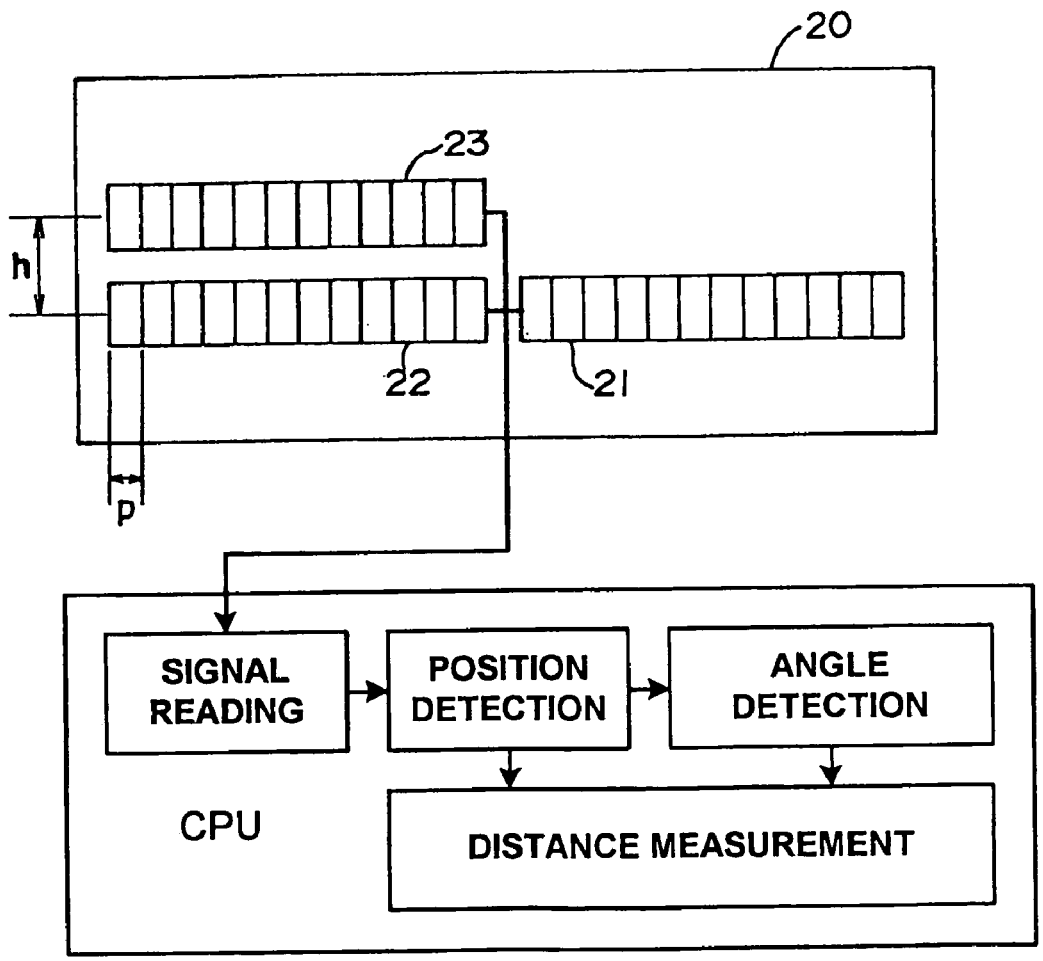
FIG. 2 is a plan view of the sensor layout of the first embodiment.

The distance measuring device 10 is provided with an optical unit 40 and a sensor unit 20, as shown in the perspective view of FIG. 1(a) and the see-through perspective of FIG. 1(b). The optical unit 40 is provided with a pair of optical systems, each of the optical systems includes at least one lens. The sensor unit 20 is provided with a first and a second sensor array 21 and 22 aligned linearly at the approximate image forming positions of the optical systems of the optical unit 40, as shown in FIGS. 1(a), 1(b), and FIG. 2, and is further provided with a third sensor array 23 arranged parallel to and at a distance h from the second sensor array 22. The sensor arrays 21, 22, 23 have a plurality of photoreceptor elements aligned in rows at a pitch p.

The outputs from the first to third sensor arrays are read out via a reading circuit under a control of a CPU. The CPU carries out position detection of the images and angle detection as described below.

Figure 3:
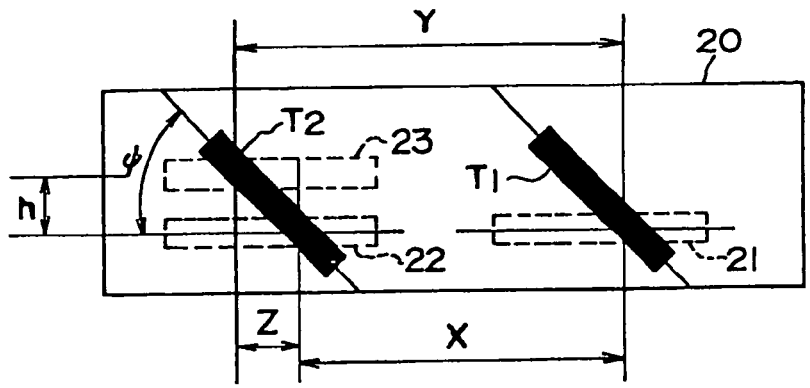
FIG. 3 is a plan view showing the image forming condition on the sensor.

If the object images $T_1$ and $T_2$ are formed while maintaining an angle ψ (where ψ≠90°) relative to the length direction of the sensor arrays 21, 22, 23, the object images $T_1$ and $T_2$ are formed with a dislocation on the first through third sensor arrays 21, 22, 23, as shown in FIG. 3. That is, the object images $T_1$ and $T_2$ are formed with an image interval X on the first and the second sensor arrays 21 and 22, formed with an image interval Y on the first and the third sensor arrays 21 and 23, and formed with an image interval Z on the second and the third sensor arrays 22 and 23. The relationship tan ψ=h/Z obtains among the angle ψ, the distance h of the second and the third sensor arrays 22 and 23, and the image interval Z.

The image interval Z can be determined by the difference in the image intervals X and Y, where the image interval X is determined by calculating the correlation coefficient of the object luminance distribution output by the first and the second sensor arrays 21 and 22, and the image interval Y is determined by calculating the correlation coefficient of the object luminance distribution output by the first and the third sensor arrays 21 and 23.

Figure 4:
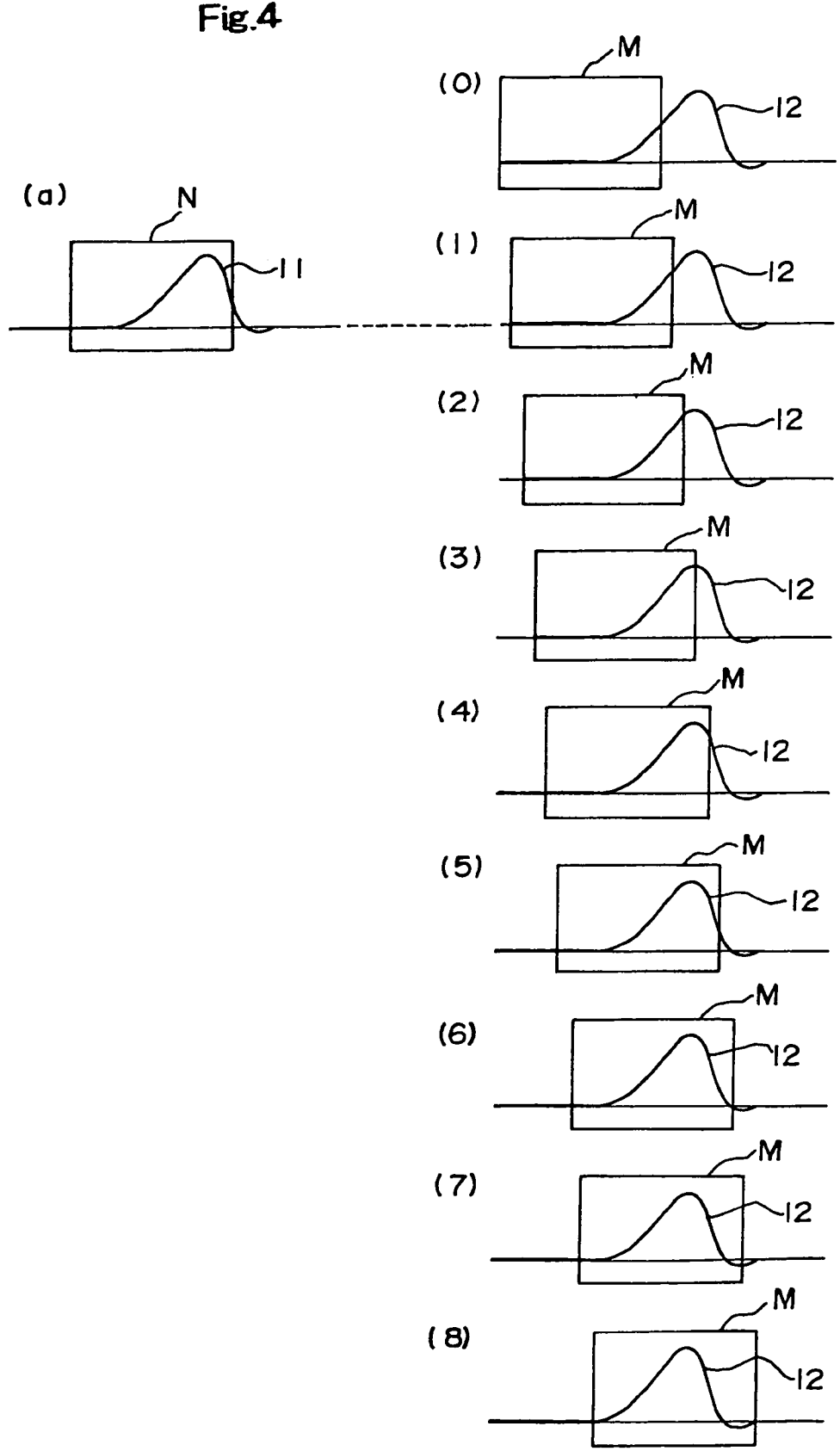
FIG. 4 illustrates the signal series processing.

Specifically, initially the range N of the standard luminance distribution of an object (hereinafter referred to as "standard part") is set for the photoreception signal 11 of the first sensor array 21, as shown in (a) of FIG. 4. Then, the range M of a predetermined magnitude at a predetermined position (hereinafter referred to as "reference part") is set for the photoreception signal 12 of the second sensor array 22, as shown in (0) of FIG. 4. Then, for example, the absolute value of the difference between the luminance value of each photoreceptor element included in the standard part N and the luminance value of each corresponding photoreceptor element included in the reference part M is calculated across all photoreceptor elements of the standard part N, and the differences are added to obtain the correlation coefficient f(0). The position of the reference part M is sequentially shifted, as shown in (1)–(8) of FIG. 4, and the correlation coefficients f(1), f(2), . . . f(8) of the standard part N are calculated to create the correlation coefficient series f(i).

Figure 5:
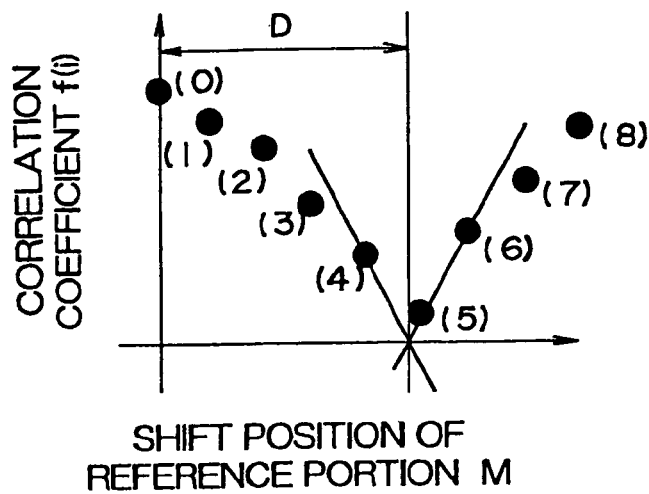
FIG. 5 is a graph of the correlation coefficient.

The image interval X is determined based on the position D illustrated in FIG. 5 at which the value of the correlation coefficient series f(i) is minimum. Since the correlation coefficient series f(i) is an intermittent value for each predetermined interval (i.e., an integer multiple of the interval p), the position D of the reference part M most closely matching the standard part N can be determined by appropriate interpolation via well-known methods using the smallest correlation coefficient, e.g., f(5), included between a plurality of correlation coefficients, e.g., f(3)–f(7), and a more detailed image interval X can thereby be calculated.

The image interval Y is similarly calculated using the output of the first sensor array 21 and the third sensor array 23. Then, the image interval Z=Y−X is calculated by the difference between the image intervals X and Y.

Then, the angle ψ formed by the object images $T_1$ and $T_2$ and the sensor arrays 21, 22, 23 can be determined by the equation below.

$$\psi = \tan^{-1}(h/z) \quad (1)$$

Strictly speaking, since the second sensor array 22 and the third sensor array 23 detect the luminance distributions at different parts of the object, i.e., the object image, the luminance distributions of the second sensor array 22 and the third sensor array 23 are not restricted to being identical, but the luminance distributions of the second and third sensor arrays 22 and 23 can be regarded as nearly identical when the spacing h between the second and third sensor arrays 22 and 23 is sufficiently small, and therefore does not pose a problem from a practical standpoint.

The desired effectiveness can also be obtained by converting the luminance values of the photoreception signals 11 and 12 of the first and the second sensor arrays 21 and 22 to suitable information (e.g., analog-to-digital conversion) using the output signals of all the photoreceptor elements and using the difference therebetween rather than using the difference of the luminance values of the standard part N and the reference part M.

The image interval X calculated using the first and the second sensor arrays 21 and 22 will differ depending on the angle ψ formed by the object images $T_1$ and $T_2$ and the sensor arrays 21, 22, 23 as described previously. That is, there is a rotational error. However, if the magnitude of the angle θ formed by the optical base length $R_0$ and the sensor base length $R_1$ is known, the image interval X can be corrected by the standard image interval K when the object images $T_1$ and $T_2$ intersect the optical base length $R_1$ at right angles using the equation below.

$$K = X(1 - \tan\theta/\tan\phi) \quad (2)$$

$$\text{Where } \phi = (\psi + \theta) \quad (3)$$

Figure 19:
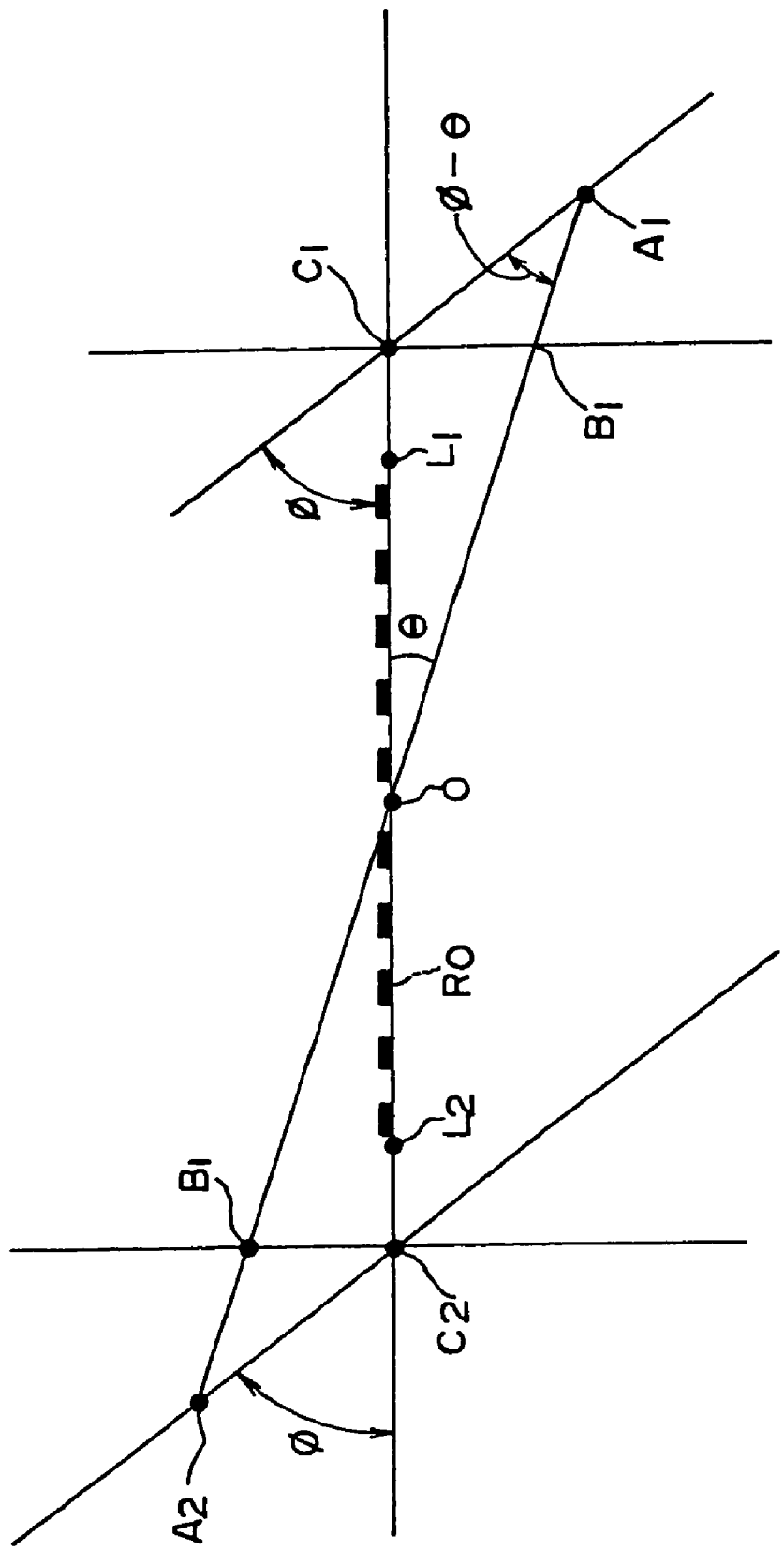
FIG. 19 illustrates the image-forming condition on the sensor of the first embodiment.

As shown in FIG. 19, the intersection of the straight line (i.e., the straight line including the optical base length $R_0$) connecting the optical axes $L_1$ and $L_2$ of the optical systems and the straight line connecting the first and the second sensor arrays 21 and 22 is designated O, the relative angle is θ, the intersections (detection positions) of the object images $T_1$ and $T_2$ and the sensor arrays 21 and 22 are respectively designated $A_1$ and $A_2$, and the intersections of the straight line connecting the optical system optical axes $L_1$ and $L_2$ and the object images $T_1$ and $T_2$ are designated $C_1$ and $C_2$, and the angle formed by both is designated $\phi = (\psi + \theta)$. If the intersections (detection positions) of the object images $T_1$ and $T_2$ and the sensor arrays 21 and 22 are designated $B_1$ and $B_2$ when the object rotates and the center of the object images $T_1$ and $T_2$ rotate about the points $C_1$ and $C_2$ until the angle formed by the straight line connecting the optical axes $L_1$ and $L_2$ of the optical systems and the object images $T_1$ and $T_2$ becomes a right angle, the distance between the points $B_1$ and $B_2$ are the standard image interval K.

When the triangle $OA_1C_1$ is observed, $OA_1/\sin(\angle OC_1A_1) = OC_1/\sin(\angle C_1A_1O)$, and by substitution and rearrangement the aforesaid equation (2) is determined.

$$OA_1 = A_1A_2/2 = X/2$$

$$OC_1 = OB_1 \cos\theta = (B_1B_2/2)\cos\theta = K\cos\theta/2$$

$$\angle OC_1A_1 = 180° - \phi$$

$$\angle C_1A_1O = \phi - \theta$$

In the distance measuring device 10, the magnitude of the angle θ formed by the sensor base length $R_1$ and the optical system base length $R_0$ is determined after the distance measuring device 10 has been assembled. Then, the standard image interval K is determined by equation (2) and (3) from the value of θ and the value of ψ calculated by equation (1) after detecting the object images $T_1$ and $T_2$, and then the distance to the object can be accurately detected based on the triangulation principle using the standard image interval K without being influenced by rotation error.

This method is not limited to distance measuring devices using the triangulation principle, and may be similarly applied to focus detecting devices using a phase difference method.

As described above, the image sensing device of the first embodiment is provided with a pair of a first and a second optical system for forming an object image, and a pair of a first and a second sensor array arranged in the approximate image forming plane of the optical systems for receiving the light of the object image, and a signal reader for reading the first and the second photoreception signal series comprising at least part of the photoreception signals of each sensor array. The image sensor is further provided with a third sensor array disposed in proximity to and parallel to the second sensor array, a signal reader for reading a third photoreception signal series comprising at least a part of the photoreception signals of the third sensor array, a first corresponding position detector for detecting a first corresponding position of the second photoreception signal series relative to the first photoreception signal series, a second corresponding position detector for detecting a second corresponding position of the third photoreception signal series relative to the first photoreception signal series, and an angle detector for detecting the magnitude of the angle formed by the object, and the second and the third sensor arrays based on the first and the second corresponding positions.

The magnitude of the angle formed by the object image and the second and the third sensor arrays can be detected from the relative positional relationship of the second and the third sensor arrays, the position of the first corresponding position on the second sensor array, and the position of the second corresponding position on the third sensor array. Even if an error arises in the relative positional relationship of the optical system and the sensor arrays, if that error is known beforehand, the magnitude of the angle formed by the object and the sensor arrays can be accurately detected considering this error and correcting the magnitude of the angle formed by the object, and the second and the third sensor arrays.

Accordingly, the optical system and the sensors can be used even when there is an angle error.

Furthermore, if the relative positional relationship is known beforehand, the magnitudes of the angles formed by the object images and the second and the third sensor arrays can be calculated even if the second and the third sensor arrays are not mutually parallel, such that by similar correction in both instances the relative positional relationship between the optical systems and the sensor arrays can be determined without being influenced by the error.

The distance measuring device of the first embodiment is provided with an object distance detector for calculating the object distance based on the triangulation principle from the distance between the analogous object images formed on the first and the second sensor arrays.

According to this construction, the object distance can be calculated without error based on the triangulation principle by using a suitable magnitude of the angle formed by the second sensor arrays and the object image detected by the angle detector, for example, by adjusting the device relative to the object to obtain a fixed angle. Accordingly, the object distance can be accurately detected.

The object distance detector includes a distance corrector for correcting the distance between analogous object images formed on the first and the second sensor arrays to a distance when an angle of fixed magnitude is formed by the object and the second sensor array, and calculates the object distance based on the triangulation principle using the corrected distance.

According to this construction, the object distance is calculated based on the triangulation principle, even when the magnitudes of the angle formed by the object and the sensor arrays differ, by correcting the distance between the analogous object images formed on the first and the second sensor array to a distance when an angle of fixed magnitude is formed by the object and the sensor array. Accordingly, the object distance can be accurately detected without error by the magnitude of the angle formed by the object and the sensor array.

Figure 6:
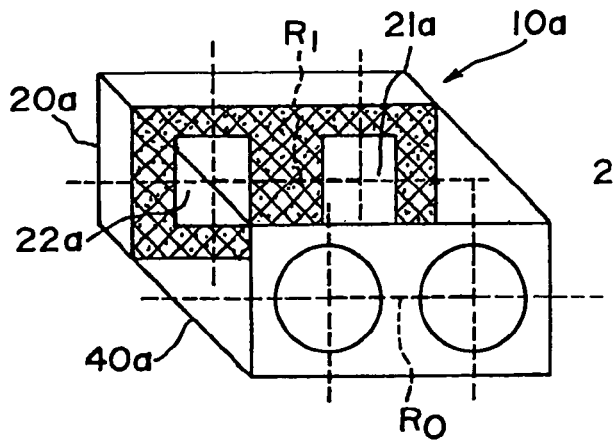
FIGS. 6(a) and 6(b) show the construction of a second embodiment.
Figure 6:
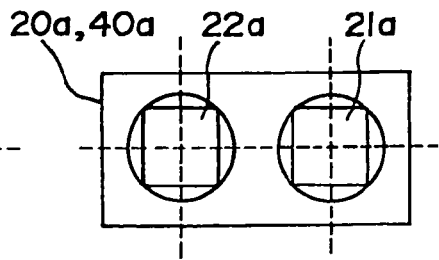
Figure 7:
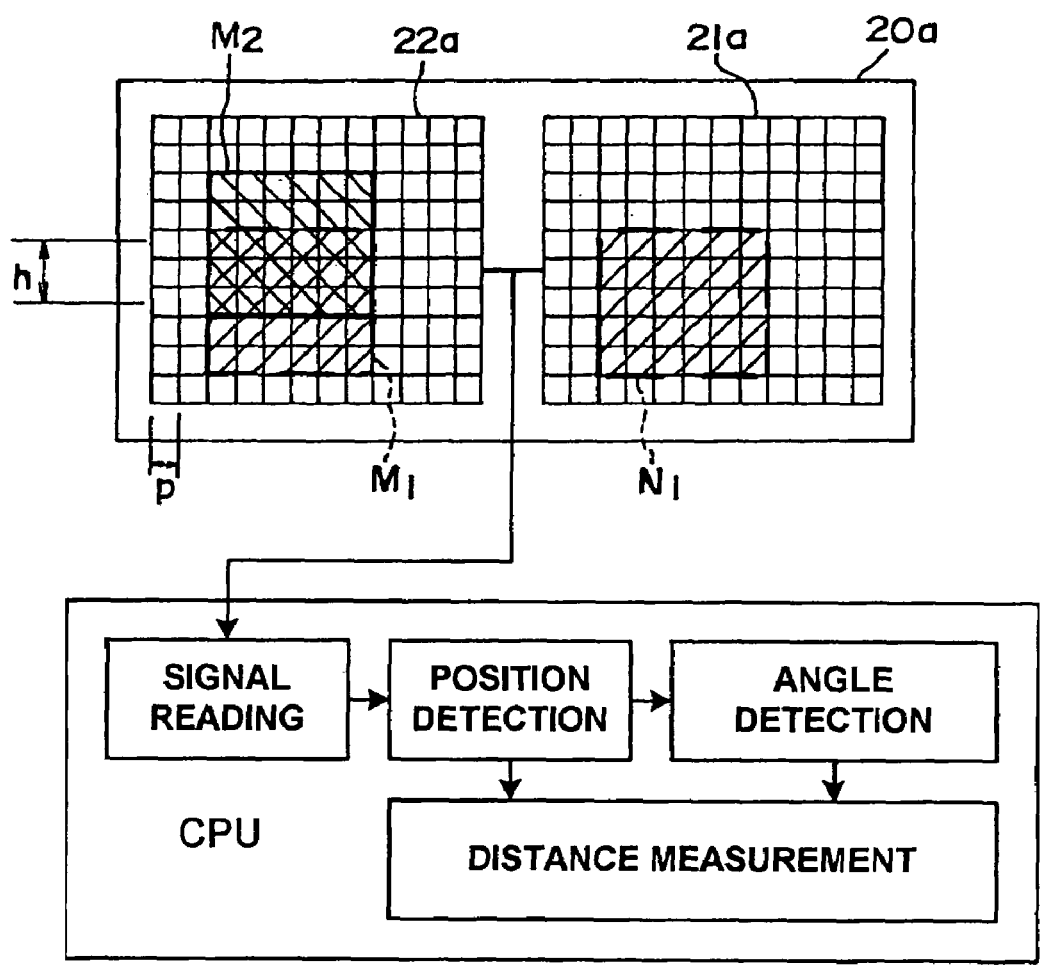
FIG. 7 is a plan view showing the sensor layout of the second embodiment.

A second embodiment substitutes two area sensors 21a and 22a for the three sensor arrays 21, 22, 23 and is described below with reference to FIGS. 6–8.

The distance measuring device 10a is provided mainly with an optical unit 40a and a sensor unit 20a as shown in the perspective view of FIG. 6(a) and the see-through view from the optical system direction of FIG. 6(b). The optical unit 40a is provided with a pair of optical systems. The sensor unit 20a is provided with a pair of a first and a second area sensors 21a and 22a at the approximate image forming positions of the optical unit 40a as shown in detail in FIG.

7. The area sensors 21a and 22a have photoreceptor elements disposed two-dimensionally at a pitch p.

The standard part N1 is set on the first area sensor 21a, and the main reference part M1 and the supplemental reference part M2 are set on the second area sensor 22a. The standard part N1 and the main reference part M1 are arranged in the layout direction of the sensor arrays 21a and 22a. The supplemental reference part M2 is set with a spacing h with the standard part N1 and the main reference part M1. The main reference part M1 and the supplemental reference part M2 partially overlap.

The standard image interval K can be determined from the image intervals X and Y, and the magnitude of the angle θ formed by the sensor base length $R_1$ of the area sensors 21a and 22a and the optical base length $R_0$, similar to the first embodiment.

Figure 8:
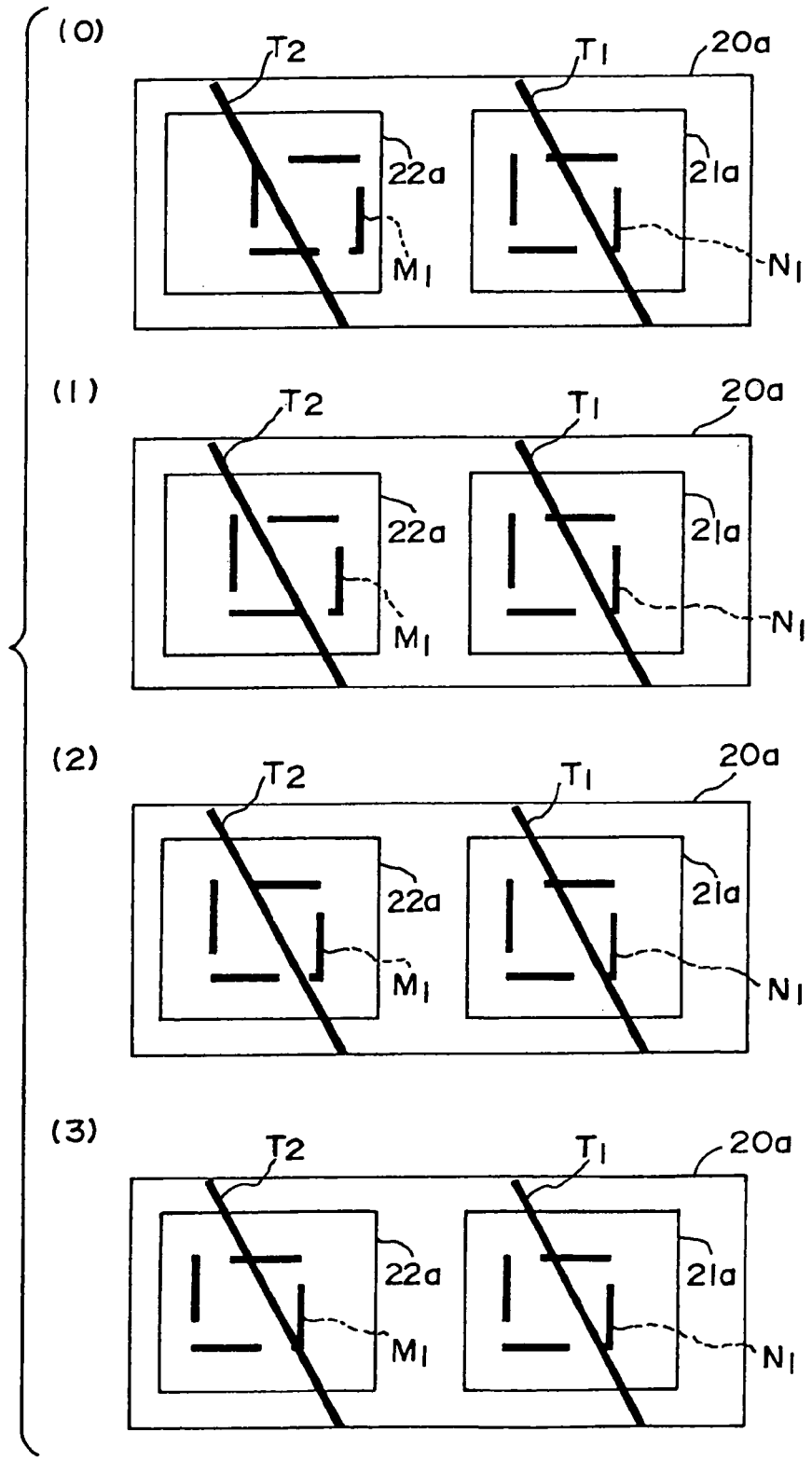
FIG. 8 is a plan view showing the image forming condition on the sensor.

Specifically, as shown in FIG. 8, the main reference part M1 of the second area sensor 22a moves sequentially in the layout direction of the sensor arrays 21a and 22a, and the correlation coefficient f(i) and the standard part N1 of the first area sensor 21a are determined at each position. The correlation coefficient f(i) is a value obtained, for example, by calculating the difference between the luminance value of each photoreceptor element of the standard part N1 and the luminance value of the corresponding photoreceptor element of the main reference part M1 across all photoreceptor elements of the standard part N1, and adding these differences to obtain the correlation coefficient f(i). The position of the main reference part M1 best matching the standard part N1 is checked from the correlation coefficient series f(0), f(i), f(2) and the like, and used as a basis for determining the image interval X. The image interval Y is determined by similarly moving the supplemental reference part M2.

In this way, the image sensing device of the second embodiment is provided with a pair of a first and a second optical system for forming an object image, and a pair of a first and a second area sensor arranged in the approximate image forming plane of the optical systems for receiving the light of the object image, and a signal reader for reading the first and the second photoreception signal groups comprising at least part of the photoreception signals of each area sensor. The image sensor is further provided with a signal reader for reading a third photoreception signal group comprising at least a part of the photoreception signals of the second area sensor, a first corresponding position detector for detecting a first corresponding position of the second photoreception signal group relative to the first photoreception signal group, a second corresponding position detector for detecting a second corresponding position of the third photoreception signal group relative to the first photoreception signal group, and an angle detector for detecting the magnitude of the angle formed by the object and the second area sensor based on the first and the second corresponding positions.

According to this construction, the angle formed by the object image and the second area sensor can be detected from the position of the first corresponding position on the second area sensor, and the position of the second corresponding position on the second area sensor.

Even if an error arises in the relative positional relationship of the optical system and the sensor arrays, if that error is known beforehand, the magnitude of the angle formed by the object and the area sensors can be accurately detected considering this error and correcting the magnitude of the angle formed by the object and the second sensor.

Accordingly, the optical system and the sensors can be used even when there is an angle error.

Furthermore, at least part of the second and the third photoreception signal groups overlap so as to include photoreception signals of the region of the same part of the second area sensor.

According to this construction, since at least a part of the second and the third photoreception signals overlap, the detected part of the same object can be readily specified, such that the magnitude of the angle formed by the object and the area sensor can be easily detected with high precision.

The distance measuring device of the second embodiment is provided with an object distance detector for calculating an object distance based on the triangulation principle based on the distance between the analogous object images of the first and the second area sensors.

According to this construction, the object distance can be calculated without error based on the triangulation principle by using a suitable magnitude of the angle formed by the second area sensor and the object image detected by the angle detector, for example, by adjusting the device relative to the object to obtain a fixed angle. Accordingly, the object distance can be accurately detected.

The object distance detector includes a distance corrector for correcting the distance between analogous object images formed on the first and the second area sensors to a distance when an angle of fixed magnitude is formed by the object and the second area sensor, and calculates the object distance based on the triangulation principle using the corrected distance.

According to this construction, the object distance is calculated based on the triangulation principle, even when the magnitudes of the angle formed by the object and the area sensors differ, by correcting the distance between the analogous object images formed on the first and the second area sensors to a distance when an angle of fixed magnitude is formed by the object and the area sensor. Accordingly, the object distance can be accurately detected without error by the magnitude of the angle formed by the object and the area sensor.

Figure 9:
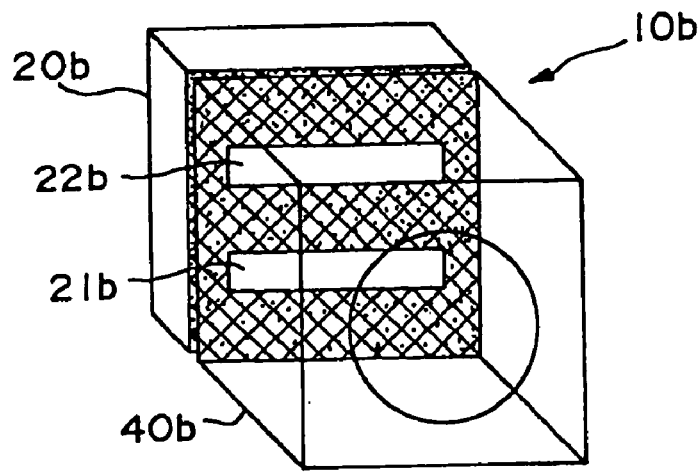
FIG. 9 shows the construction of a third embodiment.
Figure 10:
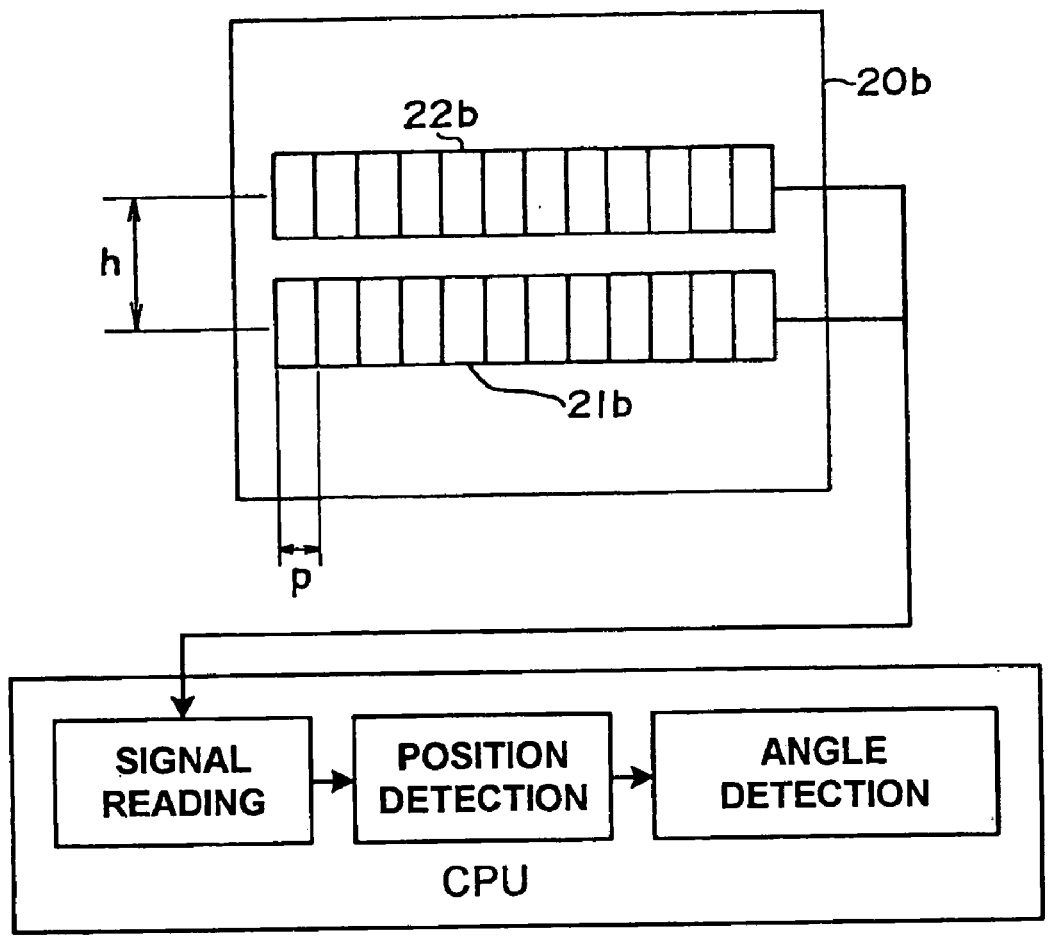
FIG. 10 is a plan view showing the sensor layout of the third embodiment.
Figure 11:
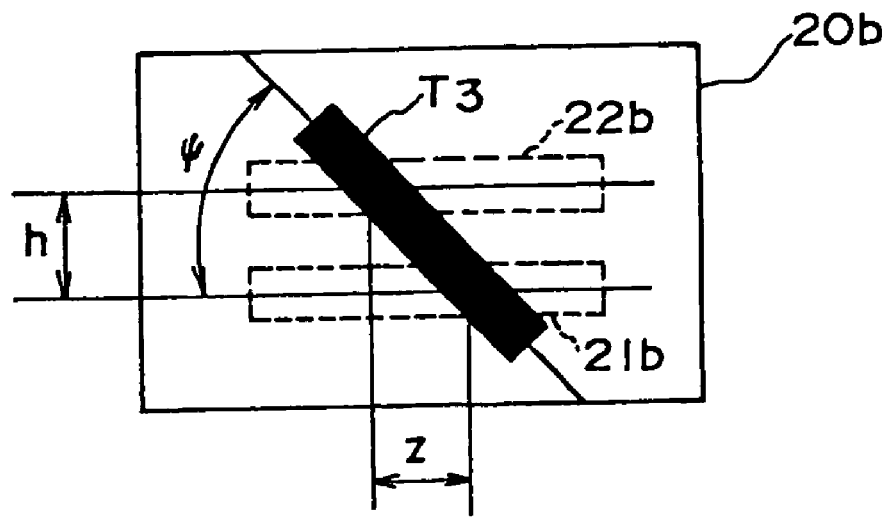
FIG. 11 is a plan view showing the image forming condition on the sensor.

A third embodiment is described below with reference to FIGS. 9–11. The image sensing device of the third embodiment is an object angle detecting device 10b.

The object angle detecting device 10b can be added to a distance measuring device based on the triangulation principle or phase difference-type focus detecting device so as to use the image sensing optical system or the photosensor of one or another of the devices. The object angle detecting device 10b is mainly provided with an optical unit 40b and a sensor unit 20b, as shown in the perspective view of FIG. 9. The optical unit 40b is provided with a single optical system. The sensor unit 20b is provided with a first and a second sensor array 21b, 22b disposed at the approximate image forming positions of the optical system of the optical unit 40b. The sensor arrays 21b, 22b have photoreceptor elements disposed in parallel with a spacing h.

If an angle $\psi(\psi \neq 90°)$ is maintained by the object image relative to the sensor arrays 21b and 22b, the object image T is shifted on the first and the second sensor arrays 21b and 22b. That is, the object image $T_3$ is formed on the first and the second sensor arrays 21b and 22b with an image interval Z.

The image interval Z is determined by calculating the correlation coefficient of the object luminance distribution output from the first and the second sensor arrays 21b and 22b. The spacing h is a previously known value. Accordingly, the angle ψ can be determined using the previously described equation (1) similar to the first embodiment. If the angle θ formed by the object angle detecting device 10b and the sensor arrays 21b and 22b is known beforehand, the angle φ formed by the object and the object angle detecting device 10b can be determined by the previously described equation (3).

In this way, the image sensing device of the third embodiment is provided with a single optical system for forming an object image, a first sensor array arranged approximately at the image forming plane of the optical system to receive the light of an object image, and a first signal reader for reading a first photoreception signal series comprising at least part of the photoreception signals of the first sensor array. The image sensing device is provided with a second sensor array arranged parallel to and in proximity with the first sensor array, a second signal reader for reading a second photoreception signal series comprising at least part of the photoreception signals of the second sensor array, a corresponding position detector for detecting an corresponding position of the second photoreception signal series relative to the first photoreception signal series, and an angle detector for detecting the magnitude of the angle formed by the object and the first and the second sensor arrays based on the corresponding position.

In this construction, the magnitude of the angle formed by the object image and the first and the second sensor arrays can be detected from the positional relationship of the corresponding image positions on the first and the second sensor arrays, and the relative positional relationship of the first and the second sensor arrays. Even if an error arises in the relative positional relationship of the sensor arrays in the device 10b, if that error is known beforehand, the magnitude of the angle formed by the object and the sensor arrays can be accurately detected considering this error and correcting the angle formed by the object and the first and the second sensor arrays.

Accordingly, the optical system and the sensors can be used even when there is an angle error.

Furthermore, if the relative positional relationship is known beforehand, the angle formed by the object image and the first and the second sensor arrays can be calculated even if the first and the second sensor arrays are not mutually parallel, such that by similar correction of the angle of the sensor arrays in the device 10b can be determined without being influenced by the error.

The image sensing device of the third embodiment described above is used in a distance measuring device which calculates an object distance based on the triangulation principle from a pair of photoreception signals obtained from a device comprising a pair of image sensing optical systems and image sensing elements. At least one or another of the image sensing optical systems and the image sensing elements of the distance measuring device has the previously described construction.

According to this construction, since the magnitude of the angle formed by the image sensing device and the object can be obtained, the magnitude of the angle formed by the distance measuring device and the object can be obtained via using the image sensing device. Using this knowledge, the object measuring accuracy can be improved. For example, the angle of the distance measuring device may be adjusted so as to be at a fixed angle relative to the object before measuring.

Furthermore, an object distance corrector is provided for correcting the object distance based on the magnitude of the angle formed by the sensor array and the object detected by the angle detector.

According to this construction, since the magnitude of the angle formed by the image sensing device and the object can be obtained, the magnitude of the angle formed by the distance measuring device and the object can be obtained via using the image sensing device. The measuring accuracy of the object distance can be improved even without adjusting the angle of the distance measuring device relative to the object by correcting the measured object distance based on the angle of the object relative to the distance measuring device.

The image sensing device of the third embodiment is used in a distance measuring device having, separate from the image sensing device, image sensing optical systems and image sensing elements used for distance measuring.

The distance measuring device is a type which calculates the object distance based on the triangulation principle from the pair of photoreception signals obtained from the image sensing device comprising a pair of image sensing systems and image sensing elements. The distance measuring device is provided with an object distance corrector for correcting the object distance in accordance with the magnitude of the angle formed by the image sensing device and the sensor array and the object detected by the angle detector of the image sensing device.

According to this construction, since the magnitude of the angle formed by the image sensing device and the object can be obtained, the magnitude of the angle formed by the distance measuring device and the object can be obtained via using the image sensing device. Similarly, the measuring accuracy of the object distance can be improved based on the angle of the object relative to the distance measuring device.

Figure 13:
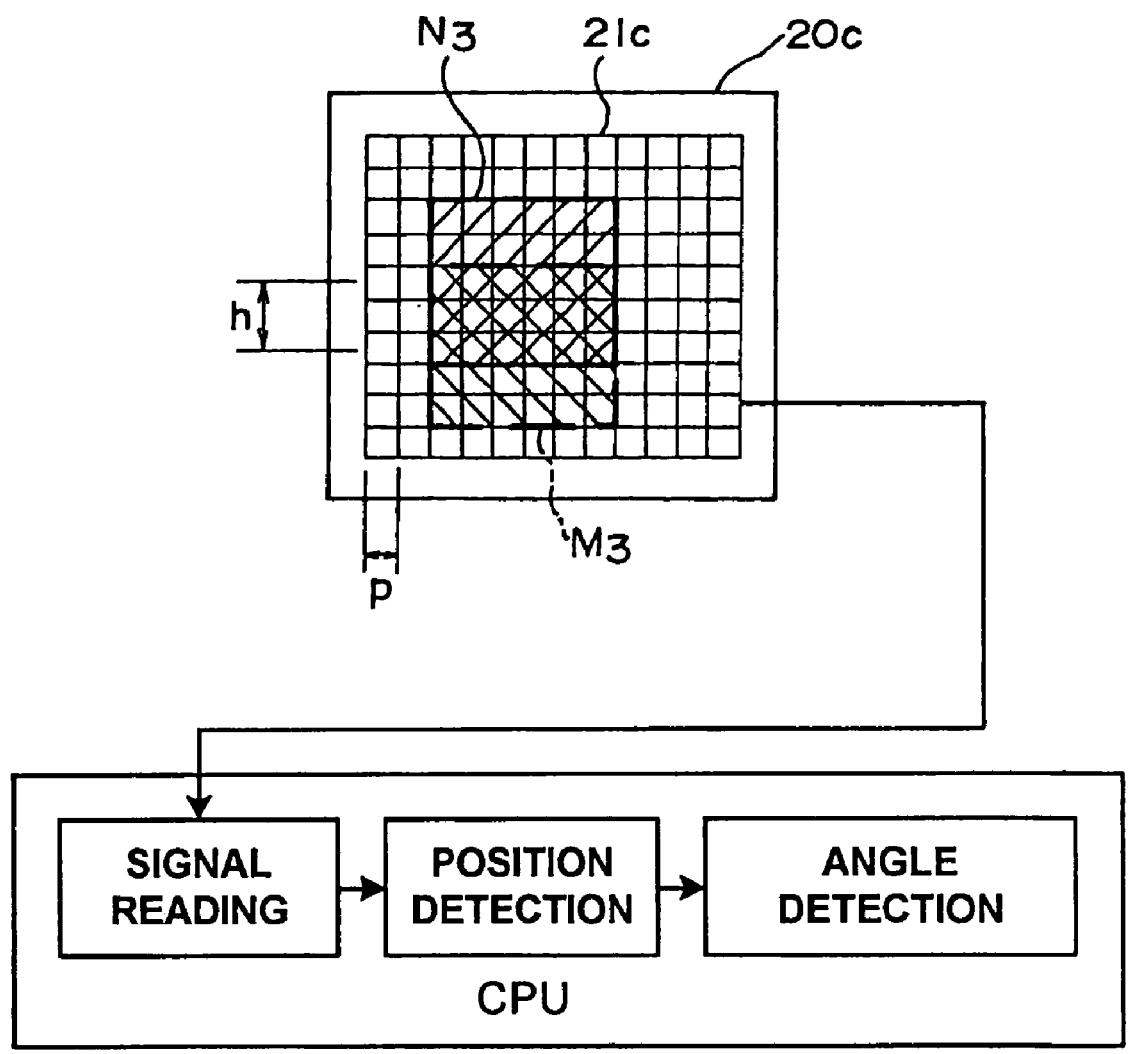
FIG. 13 is a plan view showing the sensor layout of the fourth embodiment.
Figure 14:
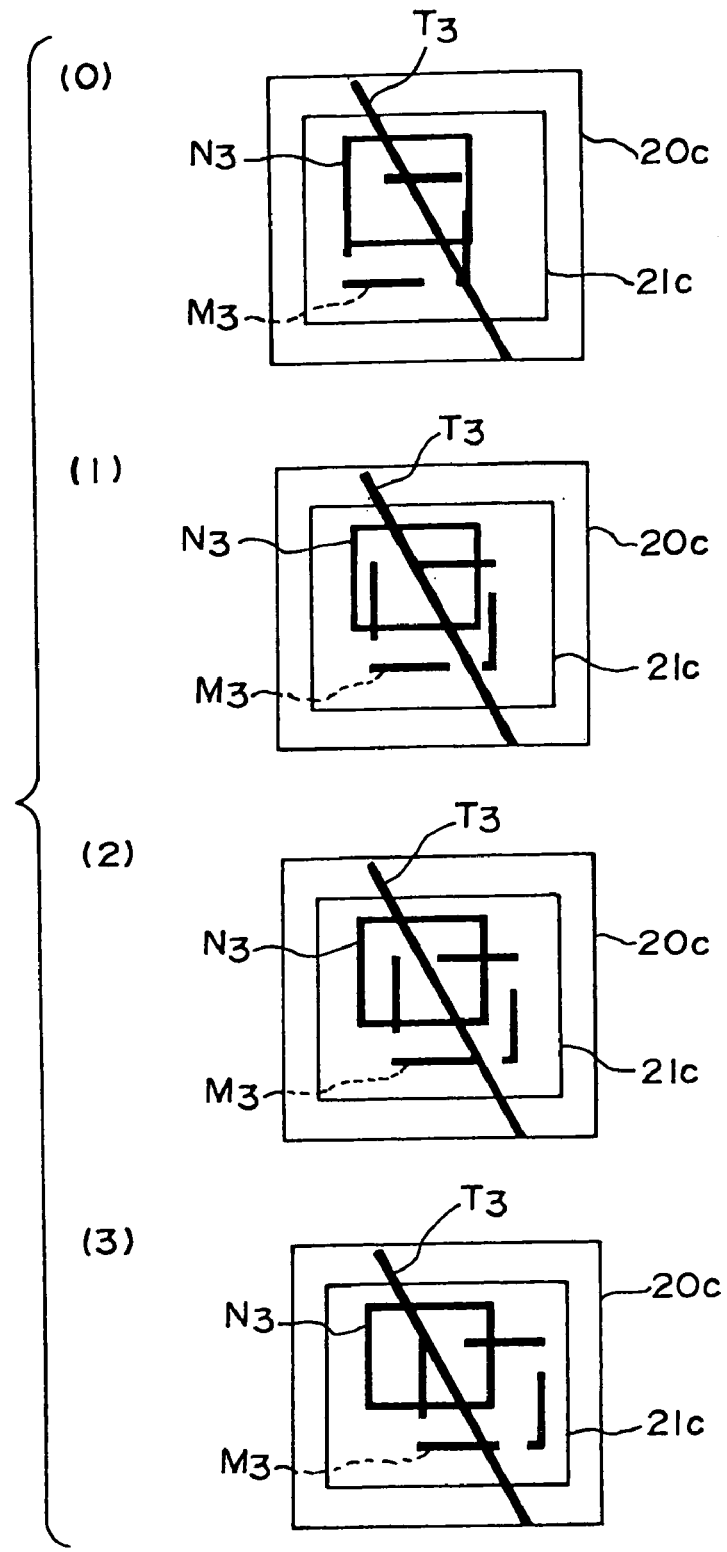
FIG. 14 illustrates the signal processing.

The image sensing device of a fourth embodiment which substitutes a single area sensor 21c for the two sensor arrays 21b and 22b is described below with reference to FIGS. 12–14. The image sensing device of the fourth embodiment is an object angle detecting device 10c.

Figure 12:
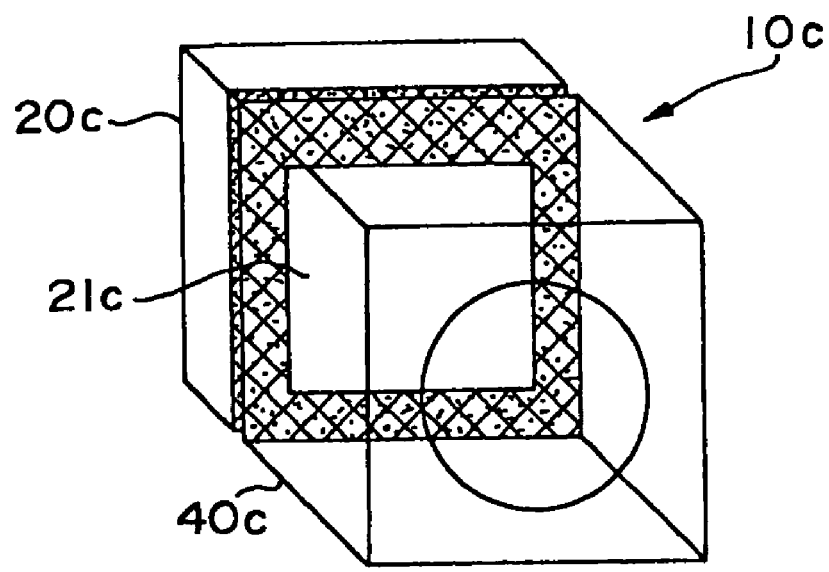
FIG. 12 shows the construction of a fourth embodiment.

The object angle detecting device 10c is mainly provided with an optical unit 40c and a sensor unit 20c, as shown in the perspective view of FIG. 12. The optical unit 40c is provided with a single optical system. The area sensor 20c has photoreceptor elements disposed two-dimensionally at a pitch p.

In the area sensor 21c, the standard part N3 and the reference part M3 are set at identical size and shapes. The reference part M3 is provided with a spacing h with the standard part N3. Similar to the second embodiment, the magnitude ψ of the angle formed by the object image and the area sensor 21c is calculated at a position at which the standard part N3 and the reference part M3 most closely match by calculating the correlation coefficients as the reference part M3 is moved relative to the standard part N3. If the angle θ formed by the object angle detecting device 10c and the area sensor 21c is known beforehand, the angle φ formed by the object and the object angle detecting device 10c can be determined via the previously described equation (3).

The image sensing device of the fourth embodiment is provided with a single optical system for forming an object image, an area sensor arranged approximately at the image forming plane of the optical system to receive the light of an object image, and a first signal reader for reading a first photoreception signal group comprising at least part of the photoreception signals of the area sensor. The image sensing device is provided with a second signal reader for reading a second photoreception signal group comprising at least part of the photoreception signals of the area sensor, a corresponding position detector for detecting a corresponding position of the second photoreception signal group relative to the first photoreception signal group, and an angle detector for detecting the magnitude of the angle formed by the object and the area sensor based on the corresponding position.

In this construction, the magnitude of the angle formed by the object image and the area sensor can be detected from the positional relationship of the corresponding position and the area sensor. Even if an error arises in the relative positional relationship of the area sensor in the device 10c, if that error is known beforehand, the magnitude of the angle formed by the object and the area sensor can be accurately detected considering this error and correcting the angle formed by the object and the area sensor.

Accordingly, the optical system and the sensor can be used even when there is an angle error.

Furthermore, at least part of the first and the second photoreception signal groups overlap so as to include photoreception signals of a region of the same part of the area sensor.

According to this construction, since at least part of the first and the second photoreception signal groups overlap, the detected part of the same object can be readily specified, such that the magnitude of the angle formed by the object and the area sensor can be easily detected with high precision.

The image sensing device of the fourth embodiment is used in a distance measuring device of a type which calculates the object distance based on the triangulation principle from a pair of photoreception signals obtained from an image sensing device comprising a pair of image sensing optical systems and image sensing elements. At least one or another of the image sensing optical systems or image sensing elements of the distance measuring device has the structure of the embodiment.

According to this construction, since the magnitude of the angle formed by the image sensing device and the object can be obtained, the magnitude of the angle formed by the distance measuring device and the object can be obtained via using the image sensing device. Using this knowledge, the object measuring accuracy can be improved. For example, the angle of the distance measuring device can be adjusted to a fixed angle relative to the object before measuring.

Furthermore, an object distance corrector is provided for correcting the object distance based on the magnitude of the angle formed by the area sensor and the object detected by the angle detector.

According to this construction, since the magnitude of the angle formed by the image sensing device and the object can be obtained, the magnitude of the angle formed by the distance measuring device incorporated in the image sensing device and the object can be obtained via using the image sensing device. The measuring accuracy of the object distance can be improved by correcting the measured object distance based on the angle of the object relative to the distance measuring device even without adjusting the angle of the distance measuring device relative to the object.

The image sensing device of the fourth embodiment is used in a distance measuring device having, separated from the image sensing device, image sensing optical systems and image sensing elements used for distance measuring.

The distance measuring device is a type which calculates the object distance based on the triangulation principle from the pair of photoreception signals obtained from the image sensing device comprising a pair of image sensing systems and image sensing elements. The distance measuring device is provided with an object distance corrector for correcting the object distance in accordance with the magnitude of the angle formed by the image sensing device and the area sensor and the object detected by the angle detector of the image sensing device.

According to this construction, since the magnitude of the angle formed by the image sensing device and the object can be obtained, the magnitude of the angle formed by the distance measuring device incorporated in the image sensing device and the object can be obtained via using the image sensing device. Similarly, the measuring accuracy of the object distance can be improved based on the angle of the object relative to the distance measuring device.

The previously described distance measuring devices 10 and 10a, and object angle detecting devices 10b and 10c can be used even when an error arises in the angle formed by the optical system and the sensor via the angle ψ formed by the object image and the sensor, and the angle θ formed by the sensor and the device body or the optical system detected after assembling the device.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image sensing device comprising:
   a first optical system for forming a first object image;
   a first area sensor arranged in the approximate image forming plane of the first optical system for receiving the light of the first object image, wherein sensing elements of the first area sensor are arranged contiguously in two dimensions;
   a second optical system for forming a second object image;
   a second area sensor arranged in the approximate image forming plane of the second optical system for receiving the light of the second object image, wherein sensing elements of the second area sensor are arranged contiguously in two dimensions;
   a signal reader for reading a first photoreception signal group from said first area sensor, a second photoreception signal group from said second area sensor and a third photoreception signal group from said second area sensor, wherein the first photoreception signal group constitutes a set of two-dimensional image data from the first object image, the second photoreception signal group constitutes a first set of two-dimensional image data from the second object image, and the third photoreception signal group constitutes a second set of two-dimensional image data from the second object image;
   a position detector for detecting a first image interval by comparing the two-dimensional image data of the second photoreception signal group with the two-dimensional image data of the first photoreception signal group, and for detecting a second image interval by comparing the two-dimensional image data of the third photoreception signal group with the two-dimensional image data of the first photoreception signal group; and an angle detector for detecting a magnitude of an angle of the second object image relative to an axis of the second area sensor based on the detected image intervals.

2. An image sensing device according to claim 1, wherein said angle detector detects the angle of the second object image relative to the axis of the second area sensor by means of data of relative positional relationship of said optical systems and said area sensors.

3. An image sensing device according to claim 1, wherein at least part of the second and the third photoreception signal groups include photoreception signals from a same part of the second area sensor.

4. An image sensing device according to claim 1, wherein:
the sensing elements of each of the first and second area sensors are disposed two-dimensionally at a pitch p in each of two dimensions;
the second photoreception signal group is read from a first two-dimensional portion of the second area sensor; and
the third photoreception signal group is read from a second two-dimensional portion of the second area sensor.

5. An image sensing device according to claim 4, wherein the first and second two-dimensional portions of the second area sensor partially overlap.

6. An image sensing device according to claim 1, wherein the position detector detects the first image interval by calculating a difference between the second photoreception signal group and the first photoreception signal group, and detects the second image interval by calculating a difference between the third photoreception signal group and the first photoreception signal group.

7. A distance measuring device comprising:
a first optical system for forming a first object image;
a first area sensor arranged in the approximate image forming plane of the first optical system for receiving the light of the first object image, wherein sensing elements of the first area sensor are arranged contiguously in two dimensions;
a second optical system for forming a second object image;
a second area sensor arranged in the approximate image forming plane of the second optical system for receiving the light of the second object image, wherein sensing elements of the second area sensor are arranged contiguously in two dimensions;
a signal reader for reading a first photoreception signal group from said first area sensor, a second photoreception signal group from said second area sensor and a third photoreception signal group from said second area sensor, wherein the first photoreception signal group constitutes a set of two-dimensional image data from the first object image, the second photoreception signal group constitutes a first set of two-dimensional image data from the second object image, and the third photoreception signal group constitutes a second set of two-dimensional image data from the second object image;
a position detector for detecting a first image interval by comparing the two-dimensional image data of the second photoreception signal group with the two-dimensional image data of the first photoreception signal group, and for detecting a second image interval by comparing the two-dimensional image data of the third photoreception signal group with the two-dimensional image data of the first photoreception signal group;
an angle detector for detecting a magnitude of an angle of the second object image relative to an axis of the second area sensor based on the detected image intervals; and
a distance detector for calculating an object distance based on a distance between analogous object images formed on the first and the second area sensors.

8. A distance measuring device according to claim 7, wherein said distance detector includes a distance corrector for correcting the distance between the first and second object images formed on the first and the second area sensors to a corrected distance and that calculates the object distance using the corrected distance.

9. An image sensing device according to claim 7, wherein:
the sensing elements of each of the first and second area sensors are disposed two-dimensionally at a pitch p in each of two dimensions;
the second photoreception signal group is read from a first two-dimensional portion of the second area sensor; and
the third photoreception signal group is read from a second two-dimensional portion of the second area sensor.

10. An image sensing device according to claim 9, wherein the first and second two-dimensional portions of the second area sensor partially overlap.

11. An image sensing device according to claim 1, wherein the position detector detects the first image interval by calculating a difference between the second photoreception signal group and the first photoreception signal group, and detects the second image interval by calculating a difference between the third photoreception signal group and the first photoreception signal group.

* * * * *